(12) United States Patent
Kim et al.

(10) Patent No.: US 12,003,867 B2
(45) Date of Patent: *Jun. 4, 2024

(54) ELECTRONIC DEVICE AND METHOD FOR DISPLAYING IMAGE IN ELECTRONIC DEVICE

(71) Applicant: Samsung Electronics Co., Ltd., Suwon-si (KR)

(72) Inventors: Kyuwon Kim, Suwon-si (KR); Yusic Kim, Suwon-si (KR); Chulsang Chang, Suwon-si (KR); Hyungmin Cho, Suwon-si (KR); Jaewoong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,280

(22) Filed: Apr. 28, 2023

(65) Prior Publication Data

US 2023/0269492 A1  Aug. 24, 2023

Related U.S. Application Data

(63) Continuation of application No. 17/168,790, filed on Feb. 5, 2021, now Pat. No. 11,641,524.

(30) Foreign Application Priority Data

Feb. 7, 2020 (KR) .......................... 10-2020-0015261

(51) Int. Cl.
  *H04N 23/80* (2023.01)
  *G06T 7/33* (2017.01)
  *H04N 23/63* (2023.01)

(52) U.S. Cl.
  CPC ........... *H04N 23/80* (2023.01); *H04N 23/632* (2023.01); *G06T 7/33* (2017.01); *G06T 2207/20221* (2013.01); *G06T 2207/30201* (2013.01)

(58) Field of Classification Search
  CPC .... H04N 23/80; H04N 23/632; H04N 23/611; H04N 23/6812; H04N 23/687;
  (Continued)

(56) References Cited

U.S. PATENT DOCUMENTS 7,830,409 B2  11/2010  Hwang et al.
8,259,624 B2  9/2012  Schirdewahn
(Continued)

FOREIGN PATENT DOCUMENTS

JP   2014-135732 A    7/2014
KR   10-2018-0010042 A  1/2018
KR   10-2193567 B1   12/2020

OTHER PUBLICATIONS

International Search Report dated May 17, 2021, issued in International Patent Application No. PCT/KR2021/001533.
(Continued)

*Primary Examiner* — Kelly L Jerabek
(74) *Attorney, Agent, or Firm* — Jefferson IP Law, LLP

(57) ABSTRACT

A method for displaying an image in an electronic device is provided. The method includes obtaining a first image including a plurality of subjects, setting a plurality of sub-regions respectively including the plurality of subjects, obtaining a distance between the plurality of sub-regions, when a distance between a first region and a second region, which are adjacent to each other, among the plurality of sub-regions is greater than or equal to a specified threshold distance, omitting at least a portion of a third region disposed between the first region and the second region in the (Continued)

first image, and displaying a second image obtained by resetting a size of each of the plurality of sub-regions and rearranging each of the plurality of sub-regions.

23 Claims, 14 Drawing Sheets

(58) Field of Classification Search
CPC ...... H04N 23/69; H04N 23/698; H04N 23/60; H04N 23/54; H04N 23/55; H04N 25/134; G06T 7/33; G06T 2207/20221; G06T 2207/30201
See application file for complete search history.

(56) References Cited

U.S. PATENT DOCUMENTS

| | | | |
|---|---|---|---|
| 9,398,222 B2 | 7/2016 | Yamashita et al. | |
| 9,781,350 B2 | 10/2017 | Gao et al. | |
| 10,158,807 B2 | 12/2018 | Jung et al. | |
| 10,284,789 B2 | 5/2019 | Banik et al. | |
| 10,423,194 B2 | 9/2019 | Lee | |
| 10,871,798 B2 | 12/2020 | Lee | |
| 11,641,524 B2 * | 5/2023 | Kim | H04N 23/698 348/207.99 |
| 2014/0078372 A1 | 3/2014 | Yamashita et al. | |
| 2016/0027201 A1 | 1/2016 | Saito | |
| 2016/0259992 A1 | 9/2016 | Knodt et al. | |
| 2018/0196472 A1 | 7/2018 | Lee | |
| 2018/0241949 A1 | 8/2018 | Kawai | |
| 2019/0089910 A1 | 3/2019 | Banik et al. | |
| 2019/0220713 A1 | 7/2019 | Kauffmann et al. | |
| 2019/0230296 A1 | 7/2019 | Matsuhira | |
| 2020/0019213 A1 | 1/2020 | Lee | |
| 2020/0169672 A1 | 5/2020 | Li et al. | |

OTHER PUBLICATIONS

Anonymous, "How to Change Space Between Objects," XP055980118, https://web.archive.org/web/20150419005304/https://www.iresizer.com/iresizer-how-to-change-space-between-objects.html, Apr. 19, 2015.

Extended European search report dated Nov. 23, 2022, issued in European Patent Application No. 21750666.6.

Chinese Office Action dated Jan. 9, 2024, issued in Chinese Application No. 202180012104.2.

* cited by examiner

ELECTRONIC DEVICE AND METHOD FOR DISPLAYING IMAGE IN ELECTRONIC DEVICE

CROSS-REFERENCE TO RELATED APPLICATION(S)

This application is a continuation application of prior application Ser. No. 17/168,790 filed on Feb. 5, 2021, which is based on and claims priority under 35 U.S.C. § 119(a) of a Korean patent application number 10-2020-0015261, filed on Feb. 7, 2020, in the Korean Intellectual Property Office, the disclosure of which is incorporated by reference herein its entirety.

BACKGROUND

1. Field

The disclosure relates to an electronic device and technologies for displaying images in the electronic device. More particularly, the disclosure relates to displaying an image captured from a plurality of parties on one screen, a plurality of subjects may be set to focused subjects at one party or one end-point.

2. Description of Related Art

An electronic device may set a portion of an image to a zoom region using its camera. When instructions stored in a memory of the electronic device are executed, a processor of the electronic device may set a zoom region around a specified object using the camera. For example, the processor may capture a plurality of images using the camera and may obtain information associated with movement of an object between the plurality of images. The processor may set the object to a focused subject and may track the focused subject to obtain the information associated with the movement. The processor may perform automatic zoom of automatically zooming in on the focused subject. When the automatic zoom is performed, a zoom region may be generated to include the focused subject. The processor may track the focused subject using an object detection technology based on a convolutional neural network (CNN).

Meanwhile, the electronic device may segment and display an image captured from a plurality of parties on one screen. For example, the electronic device may display a plurality of images obtained by capturing a video on a frame-by-frame basis on one screen. For another example, the electronic device may transmit image data captured by a plurality of cameras to another electronic device. Receiving the image data, the other electronic device may display a screen segmenting a plurality of images based on the image data.

The above information is presented as background information only to assist with an understanding of the disclosure. No determination has been made, and no assertion is made, as to whether any of the above might be applicable as prior art with regard to the disclosure.

SUMMARY

When an existing electronic device sets a zoom region around a specified object and segments and displays an image captured from a plurality of parties on one screen, a plurality of subjects may be set to focused subjects at one party or one end-point. When the focused subject is plural in number, a space may be generated between the focused subjects.

When there is the space between the focused subjects, the existing electronic device may set a zoom region to include all of the focused subjects. When setting the zoom region to include all the focused subjects, it may not be easy to zoom in on and display each of the subjects over a specified ratio.

Aspects of the disclosure are to address at least the above-mentioned problems and/or disadvantages and to provide at least the advantages described below. Accordingly, an aspect of the disclosure is to provide an electronic device for improving performance of zooming in on each of a plurality of subjects when focusing the plurality of subjects and a method for displaying an image in the electronic device.

Additional aspects will be set forth in part in the description which follows and, in part, will be apparent from the description, or may be learned by practice of the presented embodiments.

In accordance with an aspect of the disclosure, a method for displaying an image in an electronic device is provided. The method includes obtaining a first image including a plurality of subjects, setting a plurality of sub-regions respectively including the plurality of subjects, obtaining a distance between the plurality of sub-regions, when a distance between a first region and a second region, which are adjacent to each other, among the plurality of sub-regions is greater than or equal to a specified threshold distance, omitting at least a portion of a third region disposed between the first region and the second region from the first image, and displaying a second image obtained by resetting a size of each of the plurality of sub-regions and rearranging each of the plurality of sub-regions.

In accordance with another aspect of the disclosure, an electronic device is provided. The electronic device includes a lens assembly configured to capture an external environment, an image sensor configured to convert the captured external environment into image data, a display device configured to display an image generated based on the image data, a processor operatively connected with the lens assembly, the image sensor, and the display device, and a memory operatively connected with the processor. The memory may store instructions, when executed, causing the processor to obtain a first image including a plurality of subjects, set a plurality of sub-regions respectively including the plurality of subjects, obtain a distance between the plurality of sub-regions, when a distance between a first region and a second region, which are adjacent to each other, among the plurality of sub-regions is greater than or equal to a specified threshold distance, omit at least a portion of a third region disposed between the first region and the second region from the first image, and display a second image obtained by resetting a size of each of the plurality of sub-regions and rearranging each of the plurality of sub-regions.

In accordance with another aspect of the disclosure, a method for displaying an image in an electronic device is provided. The method includes obtaining a first image including a plurality of subjects, setting a plurality of sub-regions respectively including the plurality of subjects, obtaining a distance between the plurality of sub-regions, when a distance between a first region and a second region, which are adjacent to each other, among the plurality of sub-regions is greater than or equal to a specified threshold distance, displaying a second image generated based on the first region and the second region, when the distance between the first region and the second region is less than the threshold distance while displaying the second image, displaying a timer counting a specified waiting time together with the second image, and returning to the first image, when the waiting time counted by the timer elapses.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
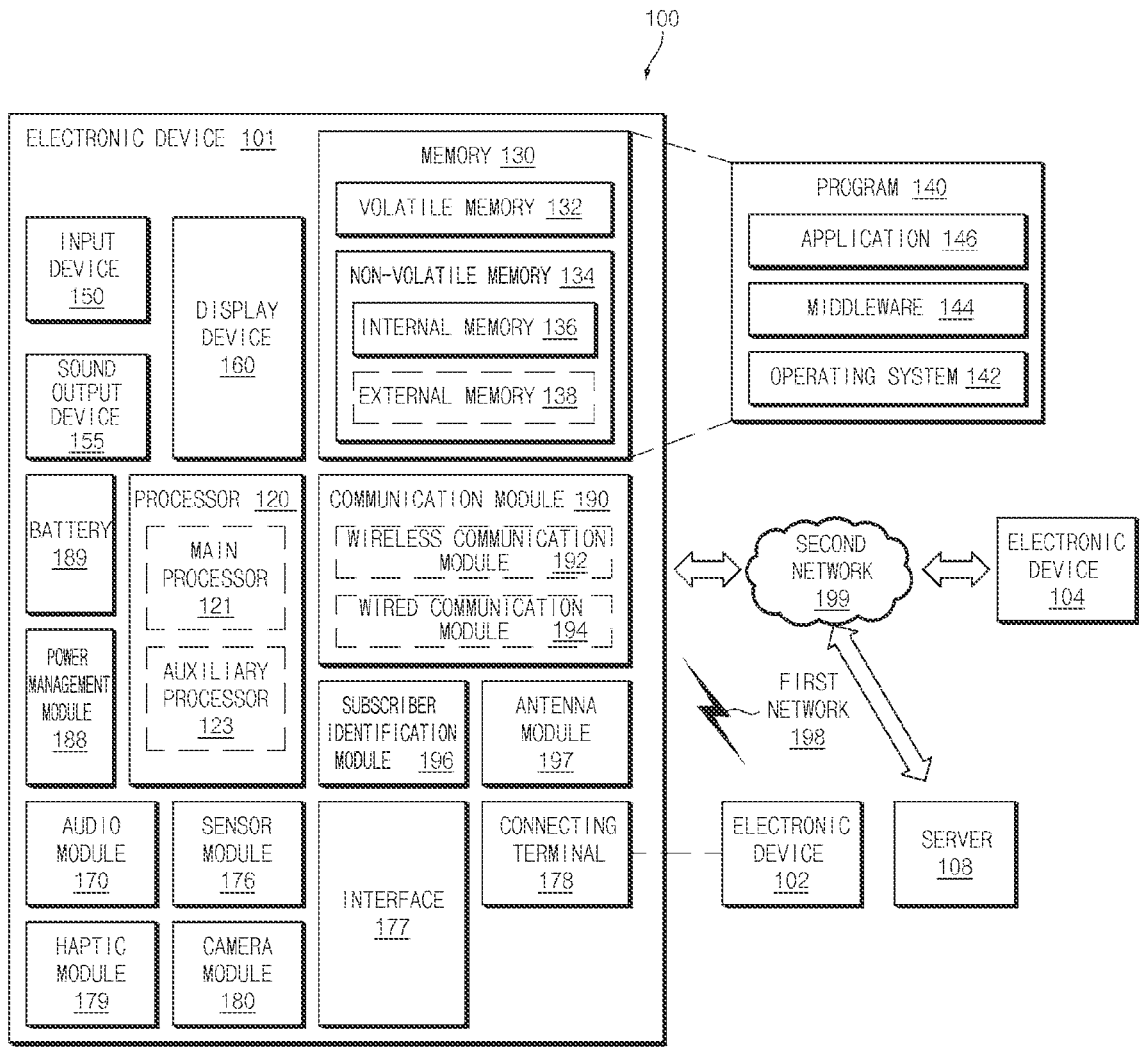
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
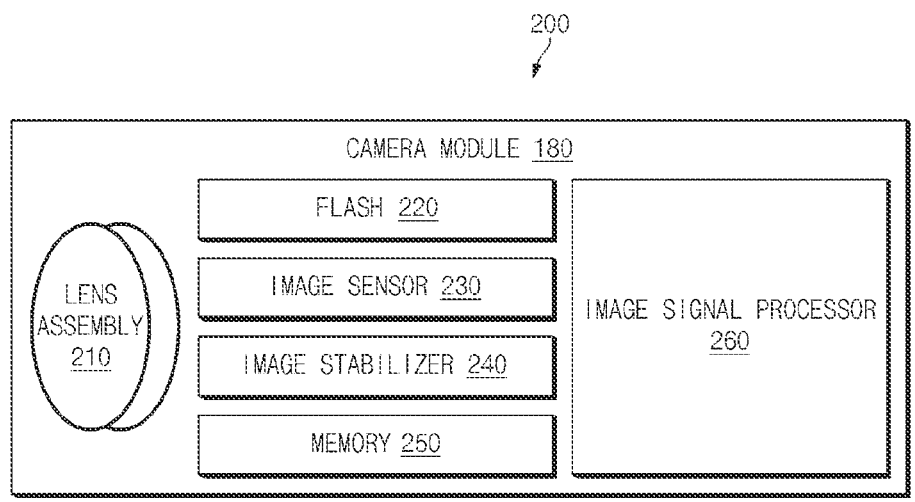
FIG. 2 is a block diagram illustrating a camera module according to an embodiment of the disclosure.

FIG. 2 is a block diagram illustrating a camera module according to an embodiment of the disclosure.

Referring to FIG. 2, in a camera 200, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
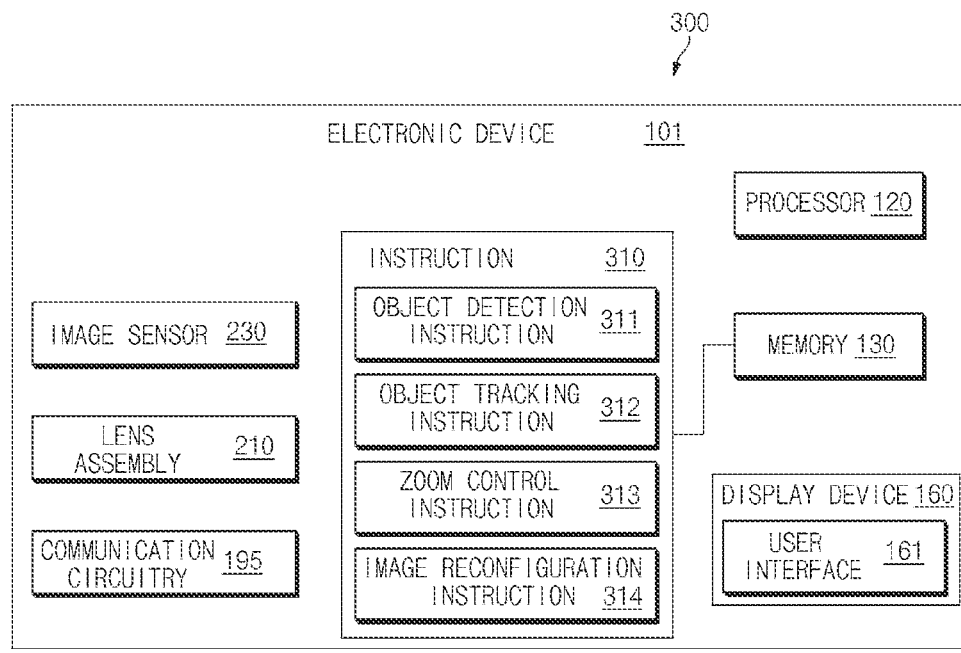
FIG. 3A is a block diagram illustrating an electronic device according to an embodiment of the disclosure.

FIG. 3A is a block diagram illustrating an electronic device according to an embodiment of the disclosure.

Referring to FIG. 3A, in a system 300, the electronic device 101 may include a processor 120, a memory 130, a display device 160, a communication circuitry 195, a lens assembly 210, and/or an image sensor 230.

In an embodiment, the processor 120 may control an operation of the memory 130, the display device 160, the communication circuitry 195, the lens assembly 210, and/or the image sensor 230. The processor 120 may execute an instruction 310 stored in the memory 130. The processor 120 may control the communication circuitry 195 to transmit and receive a radio frequency (RF) signal.

In an embodiment, the memory 130 may store the instruction 310. The instruction 310 may set an operation of the display 160, the lens assembly 210, and the image sensor 230. The instruction 310 may include an object detection instruction 311, an object tracking instruction 312, a zoom control instruction 313, and an image reconfiguration instruction 314.

In an embodiment, the display 160 may display an image. The display device 160 may include a user interface 161. The user interface 161 may include a touch interface for receiving a touch input of a user and a graphic user interface for visually guiding the user through a state of the electronic device 101.

In an embodiment, the communication circuitry 195 may be substantially the same component as a wireless communication module 192 included in a communication module 190 of FIG. 1.

In an embodiment, the lens assembly 210 may capture an external environment. The lens assembly 210 may capture at least one or more persons. The lens assembly 210 may obtain a visual image of the external environment. The lens assembly 210 may obtain light incident from the external environment.

In an embodiment, the image sensor 230 may convert the external environment into image data based on the obtained light. The image sensor 230 may display the image data as an image on the display device 160.

In an embodiment, the image sensor 230 may detect an object from the image data based on the object detection instruction 311. The image sensor 230 may detect a person from the image data based on the object detection instruction 311. The image sensor 230 may detect a plurality of objects at the same time from the image data based on the object detection instruction 311.

In an embodiment, the lens assembly 210 may track an object from the image data based on the object tracking instruction 312. The lens assembly 210 may track a moving object from the image data based on the object tracking instruction 312. The lens assembly 210 may track a person from the image data based on the object tracking instruction 312. The lens assembly 210 may select and track an object in which the user is very interested from the image data based on the object tracking instruction 312. The lens assembly 210 may set an object to be tracked to a focused subject.

In an embodiment, the lens assembly 210 may zoom in on the visual image of the captured external environment based on the zoom control instruction 313. The lens assembly 210 may zoom in on at least a portion of the visual image of the captured external environment based on the zoom control instruction 313. The lens assembly 210 may set a region to be zoomed in in the visual image of the captured external environment to a zoom region based on the zoom control instruction 313. The lens assembly 210 may set at least one or more zoom regions based on the zoom control instruction 313. The lens assembly 210 may control a zoom-in magnification of the zoom region based on the zoom control instruction 313.

In an embodiment, the processor 120 may set a zoom region to include an object to be zoomed in and displayed, based on the zoom control instruction 313. The processor 120 may control the lens assembly 210 to zoom in on an object in which the user is very interested from the image data based on the zoom control instruction 313. The lens assembly 210 may zoom in on a person in the image data based on the zoom control instruction 313. The processor 120 may set an object to be zoomed in to a focused subject. The lens assembly 210 may zoom in on the focused subject under control of the processor 120.

In an embodiment, the processor 120 may reconfigure an image based on the image reconfiguration instruction 314. The processor 120 may display the reconfigured image on the display device 160. The processor 120 may display an image obtained by zooming in on a zoom region based on the image reconfiguration instruction 314 on the display 160. The processor 120 may display an image obtained by zooming in on a person based on the image reconfiguration instruction 314 on the display 160. The processor 120 may display an image obtained by rearranging a zoom region based on the image reconfiguration instruction 314 on the display 160. The processor 120 may display an image obtained by emphasizing a zoom region based on the image reconfiguration instruction 314 on the display 160. The processor 120 may display an image moving along an object moving on a zoom region based on the image reconfiguration instruction 314 on the display 160.

Figure 3B:
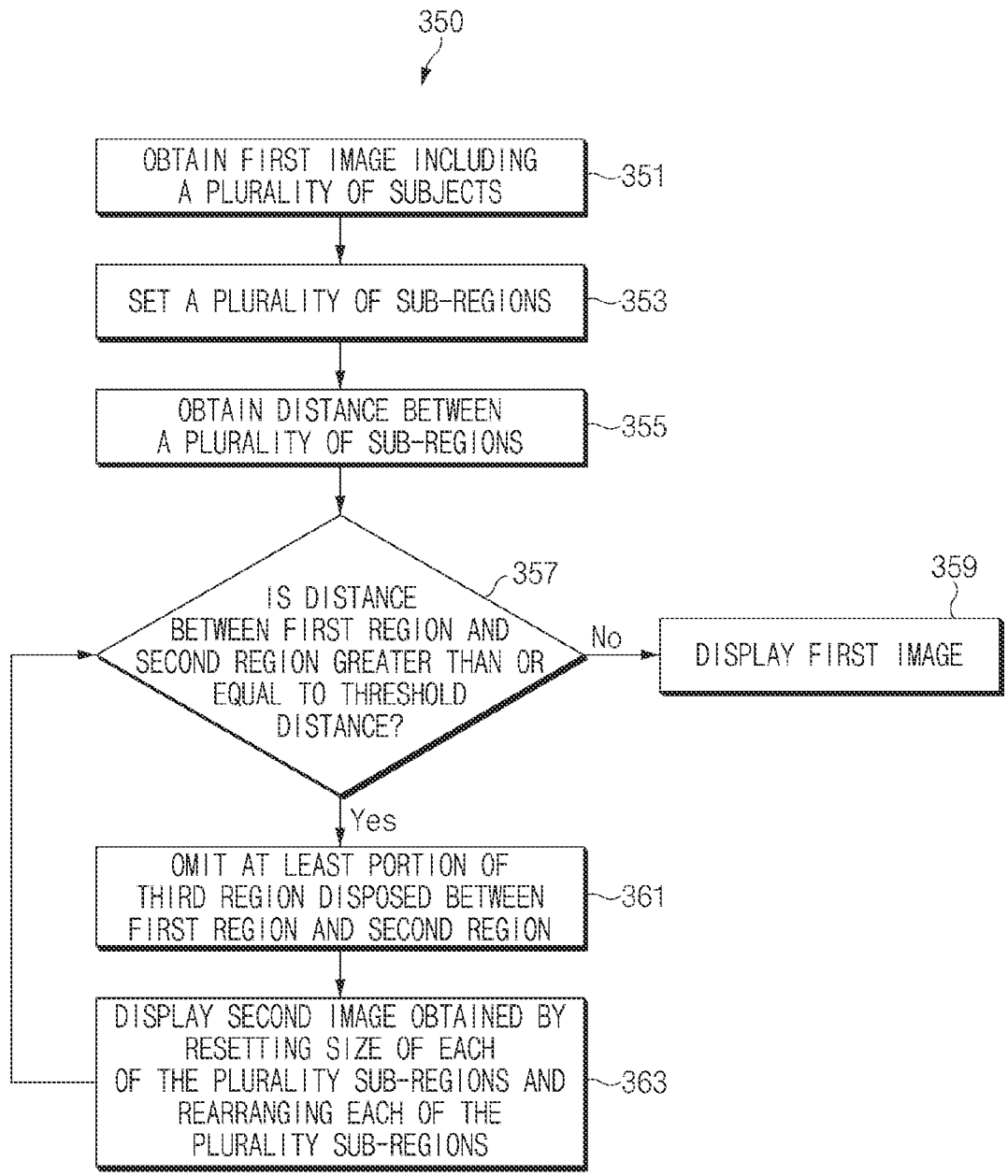
FIG. 3B is a flowchart illustrating a method for displaying an image in an electronic device according to an embodiment of the disclosure.

FIG. 3B illustrates a flowchart indicating a method for displaying an image in an electronic device (e.g., an electronic device 101 of FIG. 3A) according to an embodiment of the disclosure.

Referring to FIG. 3B, in a method 350, in operation 351, a processor (e.g., a processor 120 of FIG. 3A) of the electronic device 101 according to an embodiment may obtain a first image including a plurality of subjects. The first image may be an image captured using a camera (e.g., a camera module 180 of FIG. 2). For example, the first image may be an image obtained by means of a lens assembly (e.g., a lens assembly 210 of FIG. 3A). The plurality of subjects may be targets focused on the first image. For example, the plurality of subjects may be persons included in the captured first image.

In operation 353, the processor 120 of the electronic device 101 may set a plurality of sub-regions respectively including the plurality of subjects. The processor 120 may set each of the plurality of sub-regions to include at least one of the plurality of subjects. For example, the processor 120 may set a rectangular sub-region to surround each of persons included in the first image.

In operation 355, the processor 120 of the electronic device 101 according to an embodiment may obtain a distance between the plurality of sub-regions. The processor 120 may measure a length in a horizontal direction and a vertical direction of each of the plurality of sub-regions displayed on a display device (e.g., a display device 160 of FIG. 3A) on a pixel-by-pixel basis. The pixel-by-pixel basis may be a physical length in a horizontal and/or vertical direction of any one of a plurality of pixels arranged on the display device 160. The processor 120 may measure a distance between any two of the plurality of sub-regions on a pixel-by-pixel basis. For example, the processor 120 may measure that a first region among the plurality of sub-regions has a length in units of 50 pixels in a horizontal direction, that a second region among the plurality of sub-regions has a length in units of 30 pixels in the horizontal direction, and that a distance between the first region and the second region changes from units of 20 pixels to units of 60 pixels in the horizontal direction.

In operation 357, the processor 120 of the electronic device 101 according to an embodiment may identify whether the distance between the first region and the second region, which are adjacent to each other, among the plurality of sub-regions is greater than or equal to a specified threshold distance. Another sub-region may fail to be disposed between the first region and the second region, and a background of a first image may be filed between the first region and the second region. The threshold distance may be preset according to a size of the first region and the second region and a specified magnification condition. For example, when the threshold distance is set to 1.5 times of a length in a horizontal direction of a region with a short length in the horizontal direction between the first region and the second region, when the first region has a length in units of 50 pixels in the horizontal direction, and when the second region has a length in units of 30 pixels in the horizontal direction, the threshold distance may be a length in units of 45 pixels. When the distance between the first region and the second region, which are adjacent to each other, among the plurality of regions is less than the threshold distance (No in operation 357), the processor 120 may proceed to operation 359. When the distance between the first region and the second region, which are adjacent to each other, among the plurality of regions is greater than or equal to the threshold distance (Yes in operation 357), the processor 120 may proceed to operation 361.

In operation 359, the processor 120 of the electronic device 101 according to an embodiment may display a first screen. When the distance between the first region and the second region is less than the threshold distance, the processor 120 may determine that it is unnecessary to omit a background between the first region and the second region. The display device 160 may display a first image without change.

In operation 361, the processor 120 of the electronic device 101 according to an embodiment may omit at least a portion of a third region disposed between the first region and the second region from the first image. The third region may be a region displaying the background between the first region and the second region. When the distance between the first region and the second region is greater than or equal to the threshold distance, the processor 120 may determine to omit at least a portion of the third region to more emphasize the first region and the second region.

In operation 363, the processor 120 of the electronic device 101 according to an embodiment may display a second image obtained by resetting a size of each of the plurality of sub-regions and rearranging each of the plurality of sub-regions. The processor 120 may reset a size of each of the plurality of sub-regions to fill a region remaining after emitting the at least a portion of the third region. For example, the processor 120 may zoom in on the first region and/or the second region. The processor 120 may rearrange the zoomed-in first region and/or the zoomed-in second region to correspond to a screen composition to generate the second image. The display device 160 may display the second image, the first region and the second region of which are more emphasized.

Figure 4:
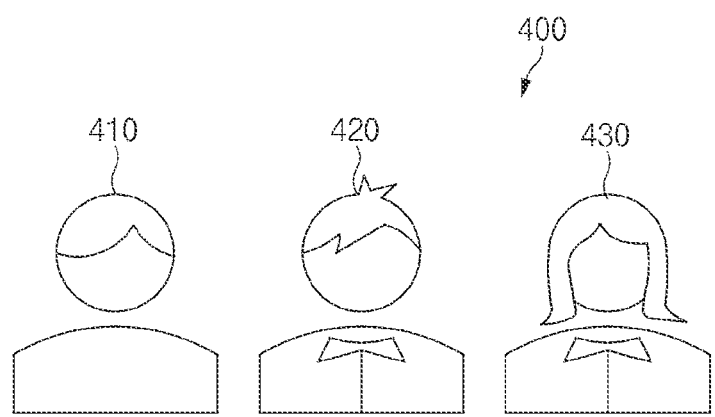
FIG. 4 is a drawing illustrating a plurality of focused subjects captured by a camera of an electronic device according to an embodiment of the disclosure.

FIG. 4 is a drawing illustrating a plurality of focused subjects captured by a camera (e.g., a camera module 180 of FIG. 2) of an electronic device (e.g., an electronic device 101 of FIG. 3A) according to an embodiment of the disclosure.

Referring to FIG. 4, a processor (e.g., a processor 120 of FIG. 3A) may set a plurality of subjects 410, 420, and 430 to persons inn image data 400, respectively. The processor 120 may obtain a first image captured by the camera module 180 and may display the obtained first image on a display device (e.g., a display device 160 of FIG. 1).

In an embodiment, the first image may be a screen, a video, and/or a preview screen captured by one camera (e.g., the camera module 180). The processor 120 may obtain the first image including the plurality of subjects 410, 420, and 430 using the one camera (e.g., the camera module 180) without using several cameras (e.g., camera modules).

In an embodiment, the plurality of focused subjects 410, 420, and 430 may include the first subject 410, the second subject 420, and the third subject 430. The first subject 410, the second subject 420, and the third subject 430 may be persons. The first image including the first subject 410, the second subject 420, and the third subject 430 may be displayed on a display device (e.g., a display device 160 of FIG. 3A).

In an embodiment, the processor 120 may set a plurality of sub-regions respectively including the plurality of subjects in the first image in the first image. The processor 120 may set each of the plurality of sub-regions to include at least one of the first subject 410, the second subject 420, and the third subject 430. The processor 120 may set each sub-region to include at least one of the first subject 410, the second subject 420, and the third subject 430. For example, the processor 120 may set a virtual rectangular region including the first subject 410, a virtual rectangular region including the second subject 420, and a virtual rectangular region including the third subject 430 to sub-regions.

Referring to FIG. 4, it is shown that a border of each of the plurality of sub-regions is not displayed. However, various embodiments are not limited thereto. The processor 120 may display a border of each of the plurality of sub-regions, which are the virtual rectangular region including the first subject 410, the virtual rectangular region including the second subject 420, and the virtual rectangular region including the third subject 430, on the display device 160.

Figure 5:
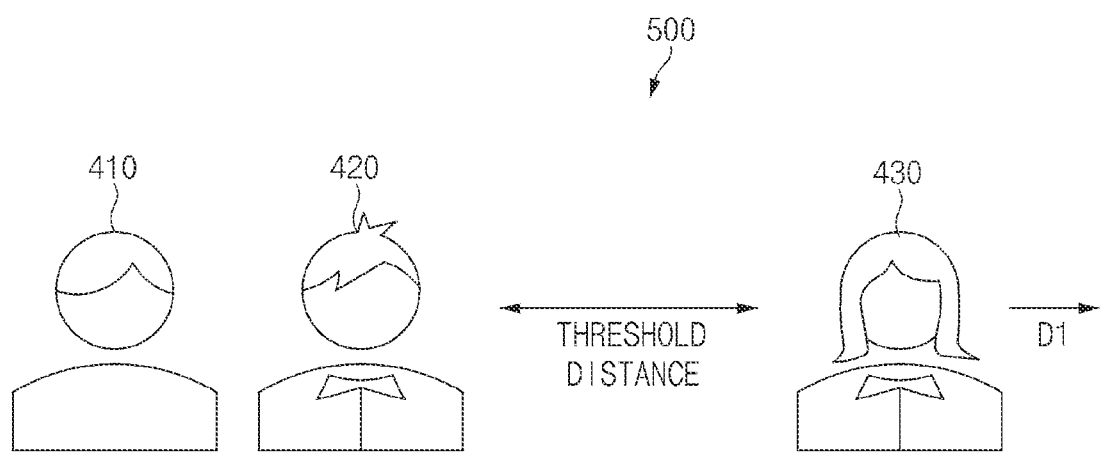
FIG. 5 is a drawing illustrating a case where a distance between at least one neighboring subject and other subjects among a plurality of focused objects captured by a camera of an electronic device is spaced greater than or equal to a threshold distance according to an embodiment.

FIG. 5 is a drawing illustrating a case where a distance between at least one neighboring subject and the other subjects among a plurality of focused subjects captured by a camera (e.g., a camera module 180 of FIG. 2) of an electronic device (e.g., an electronic device 101 of FIG. 3A) is spaced greater than or equal to a threshold distance, according to an embodiment of the disclosure.

Referring to FIG. 5, in an, at least one (430) of the plurality of focused subjects 410, 420, and 430 in image data 400 may move away from the other subjects 410 and 420. The third subject 430 may move away from the first subject 410 and the second subject 420. For example, the third subject 430 may be a rightmost captured person. The first subject 410 and the second subject 420 may be the other captured persons.

In an embodiment, a distance between the third subject 430 and the first and second subjects 410 and 420 may be less than or equal to a threshold distance (alpha). When the third subject 430 is not distant from the first subject 410 and the second subject 420, it may be less than the threshold distance. When the distance between the third subject 430 and the first and second subjects 410 and 420 is less than or equal to the threshold distance, the third subject 430 may be included in one sub-region.

In an embodiment, the distance between the third subject 430 and the first and second subjects 410 and 420 may be greater than or equal to the threshold distance. The third subject 430 may move away from the first subject 410 and the second subject 420 over the threshold distance in a first direction D1. For example, the rightmost captured person who is the third subject 430 may move away from the other captured persons who are the first subject 410 and the second subject 420 over the threshold distance in the first direction D1. When the distance between the third subject 430 and the first and second subjects 410 and 420 is greater than or equal to the threshold distance, a space may be generated between the third subject 430 and the first and second subjects 410 and 420.

When the distance between the third subject 430 and the first and second subjects 410 and 420 is greater than or equal to the threshold distance, it may fail to be easy to zoom in on the first subject 410, the second subject 420, and the third subject 430 over a certain ratio due to the space between the third subject 430 and the first and second subjects 410 and 420. Thus, the captured persons corresponding to the first subject 410, the second subject 420, and the third subject 430 may be represented to be small overall. Furthermore, unnecessary spaces may be generated in a first image. Furthermore, because it is not easy to rearrange the zoomed-in first subject 410, the zoomed-in second subject 420, and the zoomed-in third subject 430 on a display device (e.g., a display device 160 of FIG. 3A), the first subject 410, the second subject 420, and the third subject 430 may be displayed in a form limited in a specific composition on the display device 160.

In an embodiment, a processor (e.g., a processor 120 of FIG. 3A) may measure a distance between the plurality of subjects. The processor 120 may measure a distance between the plurality of sub-regions in units of pixels of the display device 160.

In an embodiment, the processor 120 may obtain a length of an outer border of each of the first subject 410, the second subject 420, and the third subject 430 and/or may obtain a distance between outer borders which are adjacent to each other. The processor 120 may obtain a length in a first direction D1 of an outer border of each of the first subject 410, the second subject 420, and the third subject 430 at a specified period and/or may obtain a distance in the first direction D1 between outer borders, which are adjacent to each other, at the specified period. For example, the processor 120 may detect that the length in the first direction D1 of the outer border of the first subject 410 is 50 unit pixels, that the length in the first direction D1 of the outer border of the second subject 420 is 40 unit pixels, and that the length in the first direction D1 of the outer border of the third subject 430 is 30 unit pixels.

In an embodiment, the processor 120 may detect that an outer border of a sub-region surrounding the third subject 430 moves away from an outer border of a sub-region surrounding the first subject 410 and the second subject 420 over a threshold distance. The threshold distance may be preset according to a size of each of the plurality of sub-regions and a specified magnification condition. For example, when the threshold distance is set to 1.5 times of a length in a horizontal direction of a region with a short length in the horizontal direction among the plurality of sub-regions, because the length in the first direction D1 of the outer border of the third subject 430 has 30 unit pixels, which is the shortest distance, the processor 120 may set the threshold distance to a length in units of 45 pixels.

Figure 6:
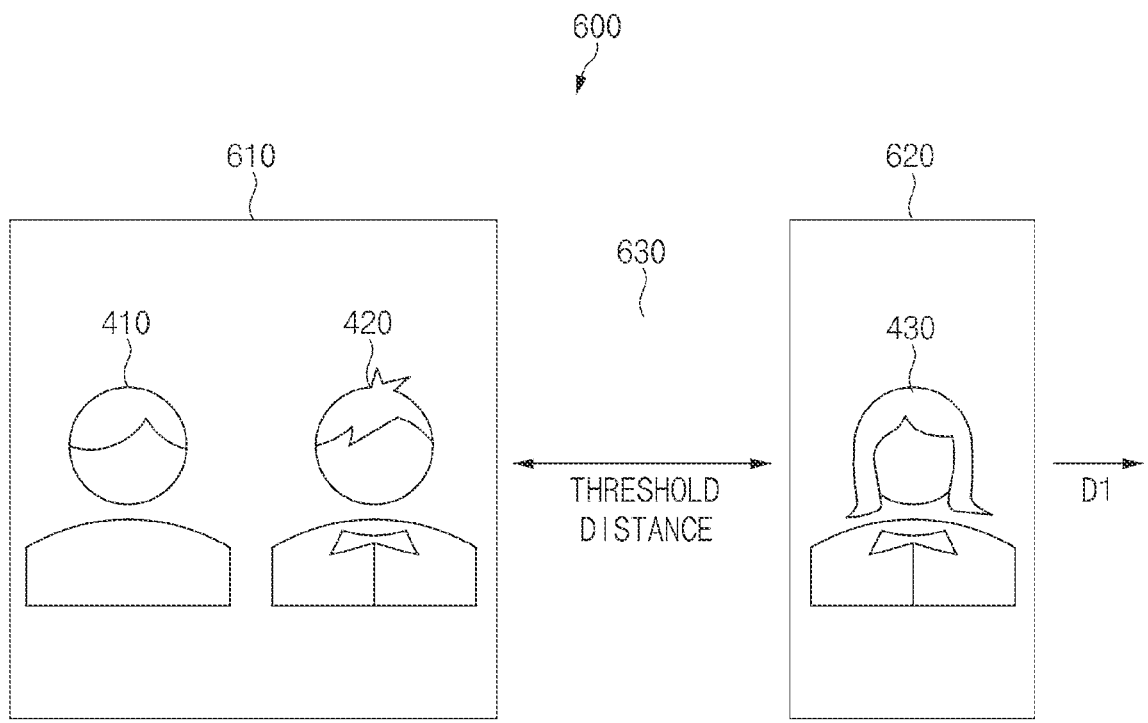
FIG. 6 is a drawing illustrating a method for setting a plurality of sub-regions to a plurality of focused subjects captured by a camera of an electronic device according to an embodiment of the disclosure.

FIG. 6 is a drawing 600 illustrating a method for setting a plurality of sub-regions 610 and 620 to a plurality of focused subjects 410, 420, and 430 captured by a camera (e.g., a camera module 180 of FIG. 2) of an electronic device (e.g., an electronic device 101 of FIG. 3A) according to an embodiment of the disclosure.

Referring to FIG. 6, in an embodiment, a processor (e.g., a processor 120 of FIG. 3A) may set the plurality of sub-regions 610 and 620 in image data 600 to respectively include the first subjects 410, the second subjects 420, and the third subjects 430. The processor 120 may determine the first subject 410 and the second subject 420, which are close or attached less than or equal to the threshold distance, as one subject. The processor 120 may include the first subject 410 and the second subject 420, which are close or attached less than or equal to the threshold distance, in one sub-region. For example, the processor 120 may set the first sub-region to include the first subject 410 and the second subject 420 and may set the second sub-region 620 to include the third subject 430. The processor 120 may set a virtual rectangle including the first subject 410 and the second subject 420 to the first sub-region 610. The processor 120 may set a virtual rectangle including the third subject 430 to the second sub-region 620.

In an embodiment, the processor 120 may detect that the at least one subject 430 moves away from the other subjects 410 and 420 over the threshold distance. For example, the processor 120 may detect that the at least one subject 430 moves away from the neighboring subject 420 over the threshold distance. For example, the processor 120 may detect that an outer border of the second sub-region 620 surrounding the third subject 430 moves away from an outer border of the first sub-region 610 surrounding the first subject 410 and the second subject 420 over the threshold distance. In this case, the processor 120 may determine that the third subject 430 moves away from the first subject 410 and the second subject 420 over the threshold distance. When the third subject 430 moves away from the first subject 410 and the second subject 420 over the threshold distance, the processor 120 may reconfigure a first image to more clearly represent the first subject 410, the second subject 420, and the third subject 430.

In an embodiment, the processor 120 may set the plurality of sub-regions 610 and 620 such that the plurality of sub-regions 610 and 620 are not overlapped with each other. The processor 120 may set the first sub-region 610 and the second sub-region 620 such that the first sub-region 610 and the second sub-region 620 are not overlapped with each other.

In an embodiment, the processor 120 may obtain a distance between the plurality of sub-regions 610 and 620. When the third subject 430 moves away from the first subject 410 and the second subject 420 over the threshold distance, the processor 120 may prepare for a trigger operation for reconfiguring the first image.

In an embodiment, an image sensor (e.g., an image sensor 230 of FIG. 3A) may obtain image data including the first sub-region 610, the second sub-region 620, and a space 630 between the first sub-region 610 and the second sub-region 620. The image sensor 230 may determine the space 630 between the first sub-region 610 and the second sub-region 620 as the third region 630.

Figure 7:
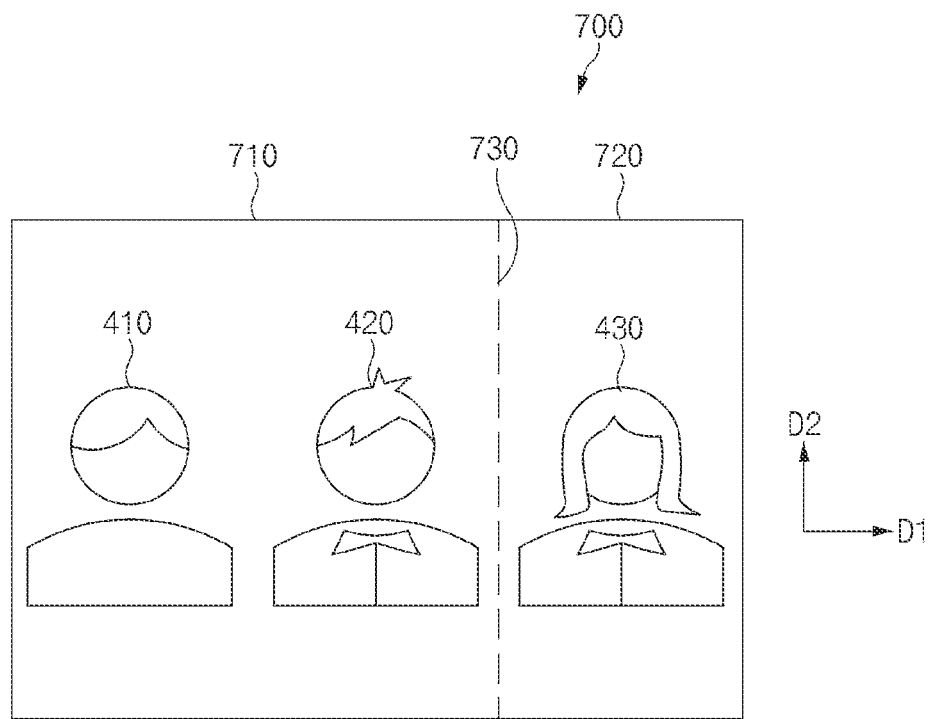
FIG. 7 is a drawing illustrating a screen rearranging and displaying a plurality of sub-regions set according to an embodiment of the disclosure.

FIG. 7 is a drawing illustrating a screen rearranging and displaying a plurality of sub-regions set according to an embodiment of the disclosure.

Referring to FIG. 7, in an embodiment, a processor (e.g., a processor 120 of FIG. 3A) may reset a size of each of the plurality of sub-regions 710 and 720 in image data 700 based on an image reconfiguration instruction (e.g., an image reconfiguration instruction 314 of FIG. 3A). For example, the processor 120 may zoom in on each of the plurality of sub-regions 710 and 720. The processor 120 may rearrange the plurality of sub-regions 710 and 720 based on the image reconfiguration instruction 314. The processor 120 may display an image obtained by rearranging the plurality of sub-region 710 and 720 on a display device (e.g., a display device 160 of FIG. 3A). The processor 120 may display a second image obtained by zooming in on and rearranging the first sub-region 710 and the sub-region 720 of a first image based on the image reconfiguration instruction 314 on the display device 160.

When a distance between the plurality of sub-regions 710 and 720 is greater than or equal to a specified threshold distance, the processor 120 may omit at least a portion of a third region (e.g., a third region 630 of FIG. 6) disposed between the plurality of sub-regions 710 and 720 from the first image. The threshold distance may be set according to a distance in a first direction D1 of each of the plurality of sub-regions 710 and 720 and a specified magnification of each of the plurality of sub-regions 710 and 720. For example, the threshold distance may be set to 1.5 times of a distance of the first direction D1 of the sub-region 720 smaller among the plurality of sub-regions 710 and 720. The processor 120 may crop some regions in the first image captured when an interval between moving interest objects is greater than or a threshold distance to digitally generate a plurality of segmented images. When the length in the first direction D1 of the third region 630 is greater than or equal to the threshold distance, the processor 120 may determine that the third region 630 is occupied over a certain rate in the first image and may crop the first sub-region 610 and the second sub-region 620 of the first image. For example, when the threshold distance is greater than or equal to 1.5 times of the distance in the first direction D1 of the sub-region 720 smaller among the plurality of sub-regions 710 and 720, the processor 120 may omit at least a portion of the third region 630 from image data.

In an embodiment, the processor 120 may display a second image obtained by resetting a size of each of the plurality of sub-regions 710 and 720 and rearranging each of the plurality of sub-regions 710 and 720. The processor 120 may resize a first sub-region 410 and a second subject 420 included in the first sub-region 710 and/or a third subject 430 included in the second sub-region 720. For example, The processor 120 may differently apply a zoom-in rate of the first subject 410 and the second subject 420 included in the first sub-region 710 and a zoom-in rate of the third subject 430 included in the second sub-region 720. The processor 120 may connect the first sub-region 710 including the first subject 410 and the second subject 420 with the second sub-region 720 including the third subject 430 to generate and display a second image on the display device 160.

In an embodiment, the processor 120 may rearrange the first subject 410 and the second subject 420 included in the first sub-region 710 and the third subject 430 included in the second sub-region 720 to be reconfigured as the one second image. For example, the processor 120 may stitch the first subject 410 and the second subject 420 included in the first sub-region 710 and the third subject 430 included in the second sub-region 720. The processor 120 may resize and arrange the first sub-region 710 and the second sub-region 720 cropped by a specific queue signal to suit the display device 160 to configure the second image.

In an embodiment, the processor 120 may rearrange the plurality of sub-regions (or the plurality of zoom regions) 710 and 720 such that the plurality of sub-regions 710 and 720 are adjacent to each other in the first direction D1 and such that a division line 730 is displayed between the plurality of sub-regions 710 and 720. The processor 120 may rearrange each of the plurality of sub-regions 710 and 720, may omit at least a portion of the third region 630, and may increase the zoom-in rate of the first sub-region 710 and the second sub-region 720. The processor 120 may notify a user of the electronic device 101 that the at least a portion of the third region 630 is omitted and that there is originally the omitted space between the first sub-region 710 and the second sub-region 720. The processor 120 may control the display device 160 to display the division line 730 between the first sub-region 710 and the second sub-region 720 based on the image reconfiguration instruction 314.

In an embodiment, the processor 120 may arrange the plurality of sub-region 710 and 720 such that the plurality of sub-regions 710 and 720 are displayed as separate windows, respectively, and such that at least some of edges and/or regions forming the windows are overlapped with each other. The rearrangement of each of the plurality of sub-regions 710 and 720 may be performed to be differently applied to zoom-in rates of the first sub-region 710 and the second sub-region 720 or to correspond to a screen ratio of the display device 160. In this case, the plurality of sub-regions 710 and 720 may be rearranged such that they are displayed as separate windows, respectively, and some of edges and/or regions forming the windows are overlapped with each other. The processor 120 may set a size and a location of a window forming the first sub-region 710 and the second sub-region 720 based on the image reconfiguration instruction 314.

Figure 8:
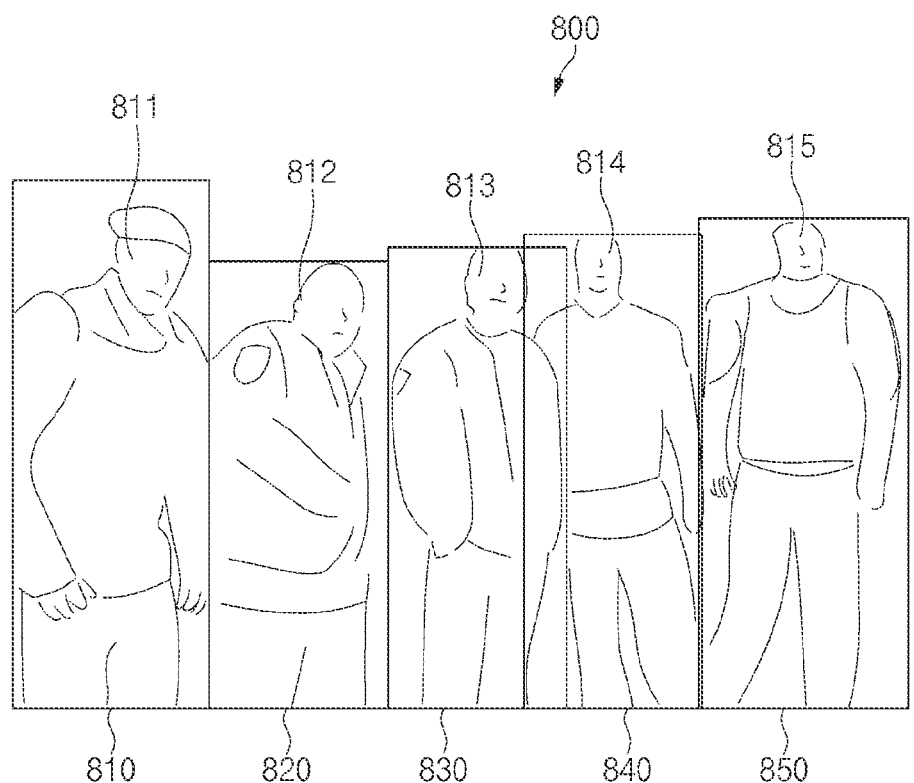
FIG. 8 is a drawing illustrating a method for setting boundary regions of each of a plurality of objects according to an embodiment of the disclosure.

FIG. 8 is a drawing illustrating a method for setting boundary regions of a plurality of subjects according to an embodiment of the disclosure.

Referring to FIG. 8, in an embodiment, a processor (e.g., a processor 120 of FIG. 3A) may obtain a distance between objects or persons included in an image. To obtain the distance between the objects or the persons included in the image, the processor 120 may set boundary regions 810, 820, 830, 840, 850 of a plurality of subjects 811, 812, 813, 814, and 815 in image data 800. For example, the processor 120 may set the first boundary region 810, the second boundary region 820, the third boundary region 830, the fourth boundary region 840, and the fifth boundary region 850 respectively including the first subject 811, the second subject 812, the third subject 813, the fourth subject 814, and the fifth subject 815.

In an embodiment, the processor 120 may control a lens assembly (e.g., a lens assembly 210 of FIG. 3A) to detect an object from image data based on an object detection instruction (e.g., an object detection instruction 311 of FIG. 3A). The processor 120 may control the lens assembly 210 to track an object from the image data based on an object tracking instruction (e.g., an object tracking instruction 312 of FIG. 3A). For example, when an object to be tracked is a person, the processor 120 may calculate a boundary box of each of the subjects 811, 812, 813, 814, and 815 and an interval between the boundary boxes in real time through human tracking. The human tracking may be a method for executing human detection to identify a position of each of the subjects 811, 812, 813, 814, and 815 and continuing tracking a position of each of the subjects 811, 812, 813, 814, and 815 based on a portion similar to a previous frame on consecutive frames of a camera (e.g., a camera module 180 of FIG. 2). Furthermore, the human detection may be a method for detecting a person based on whether a shape of the human body is detected and setting the boundary regions 810, 820, 830, 840, and 850 in the form of covering the body of the person.

Figure 9:
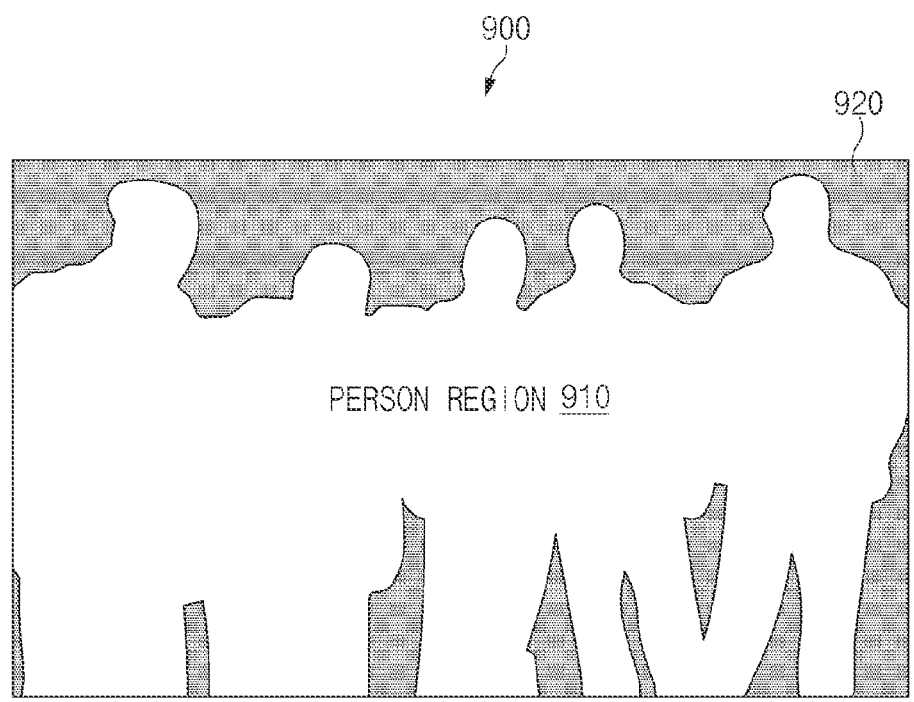
FIG. 9 is a drawing illustrating a method for setting a person region according to an embodiment of the disclosure.

FIG. 9 is a drawing illustrating a method for setting a person region 910 according to an embodiment of the disclosure.

Referring to FIG. 9, in an embodiment, a processor (e.g., a processor 120 of FIG. 3A) may separate the person region 910 from a background region 920 in a first image in image data 900. The person region 910 may be a region representing the person in the first image. The background region 920 may be a region except for the person region 910 in the first image.

In an embodiment, the processor 120 may record and/or track an interval between persons included in the person region 910 in real time based on semantic segmentation. The semantic segmentation may be a method for deriving a boundary portion or a mask on a pixel-by-pixel basis with respect to the class, "person", in the first image. The processor 120 may measure a distance between persons separated in the person region 910 of the first image based on the semantic segmentation to measure an interval between the persons in real time.

Figure 10:
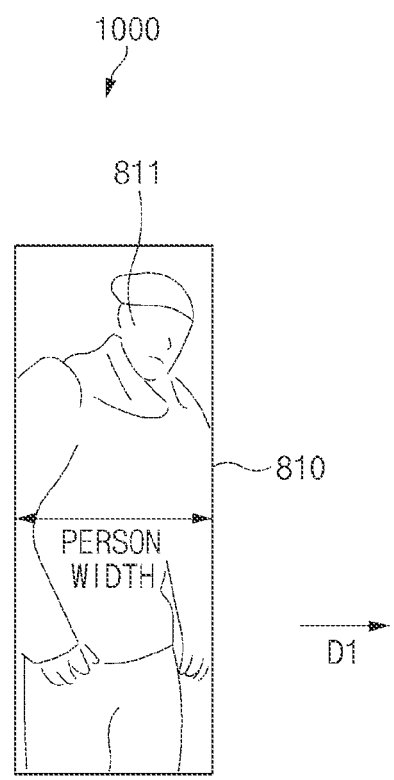
FIG. 10 is a drawing illustrating a method for setting a person width according to an embodiment of the disclosure.

FIG. 10 is a drawing illustrating a method for setting a person width according to an embodiment of the disclosure.

Referring to FIG. 10, in an embodiment, a processor (e.g., a processor 120 of FIG. 3A) may set a length in a first direction D1 of a boundary region 810 of a subject 811 to a person width in image data 1000. When the subject 811 is set to a target to be zoomed in, the boundary region 810 may be substantially the same region as a zoom region (e.g., a second zoom region 720 of FIG. 7) including one subject. The processor 120 may set a length in the first direction D1 of the zoom region 720 to the person width.

In an embodiment, the processor 120 may set a specified distance based on a width in the first direction D1 of each of the plurality of zoom regions 810. The processor 120 may obtain a threshold distance (alpha) on the basis of a length of a narrow side of the boundary region 810 of the one subject 811 based on human detection. When there are a plurality of person width values, the processor 120 may set the smallest of the person width values to the threshold distance.

In an embodiment, the processor 120 may set the threshold distance to a value obtained by multiplying the person width by a specified constant (beta). The specified constant may be generally "1". However, various embodiments are not limited thereto. The specified constant may be differently set according to an application program.

Figure 11:
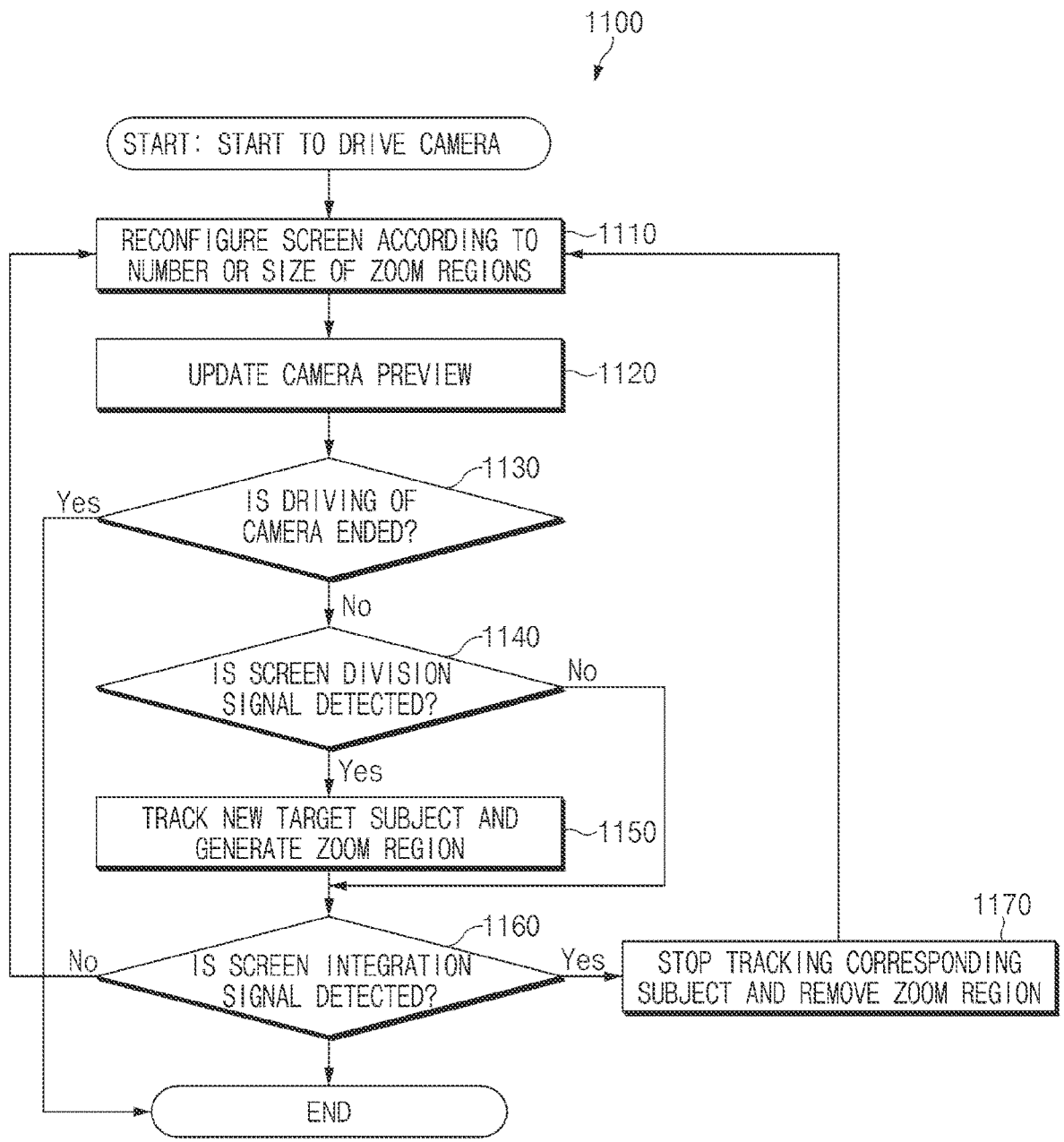
FIG. 11 is a flowchart illustrating a method for displaying an image in an electronic device according to an embodiment of the disclosure.

FIG. 11 is a flowchart illustrating a method for displaying an image in an electronic device (e.g., an electronic device 101 of FIG. 3A) according to an embodiment of the disclosure.

Referring to FIG. 11, in a method 1100, in operation 1110, a camera (e.g., a camera module 180 of FIG. 2) of the electronic device 101 according to an embodiment may perform screen reconfiguration according to the number and a size of zoom regions (e.g., a first sub-region 710 and a second sub-region 720 of FIG. 7). The camera 180 may generate a first image based on the number and a size of the sub-regions 710 and 720 and may display the first image on a display device (e.g., a display device 160 of FIG. 3A).

In operation 1120, the camera 180 of the electronic device 101 according to an embodiment may update a camera preview. The camera 180 may display a preview screen showing an external environment obtained by a lens assembly (e.g., a lens assembly 210 of FIG. 3A) in advance on the display device 160. The camera 180 may update a preview image continuously before capturing an image obtained using an image sensor (e.g., an image sensor 230 of FIG. 3A).

In operation 1130, the electronic device 101 according to an embodiment may determine whether the driving of the camera 180 is ended. When the driving of the camera 180 is ended (Yes in operation 1130), the electronic device 101 may end the above-mentioned process without proceeding to an additional operation. When the camera 180 continues being driven (No in operation 1130), the electronic device 101 may proceed to operation 1140.

In operation 1140, the electronic device 101 according to an embodiment may determine whether a screen division signal is detected. When a distance between a plurality of subjects (e.g., a plurality of subjects 410, 420, and 430 of FIG. 4) is greater than or equal to a threshold distance, the processor 120 may transmit the screen division signal to the camera 180.

In operation 1150, the camera 180 of the electronic device 101 according to an embodiment may track the new target subjects 410, 420, and 430 and generate the zoom regions 710 and 720. The camera 180 may receive the screen division signal from the processor 120 and may track the subjects 410, 420, and 430 to set the new zoom regions 710 and 720. When the distance between the subjects 410, 420, and 430 is greater than or equal to the threshold distance, the camera 180 may generate the plurality of zoom regions 710 and 720.

In operation 1160, the electronic device 101 according to an embodiment may determine whether a screen integration signal is detected. When the distance between the plurality of subjects (e.g., the plurality of subjects 410, 420, and 430 of FIG. 4) is less than the threshold distance, the processor 120 may transmit the screen integration signal to the camera 180. When the screen integration signal is detected (Yes in operation 1160), the camera 180 may proceed to operation 1170. When the screen integration signal is not detected (No in operation 1160), the camera 180 may proceed with operation 1110 to reconfigure a screen depending on the number and a size of zoom regions to display a second image.

In operation 1170, the camera 180 of the electronic device 101 according to an embodiment may stop tracking the subjects 410, 420, and 430 and may remove the zoom regions 710 and 720. The camera 180 may end the zoom-in operation and may capture and display an image in a common way.

Figure 12:
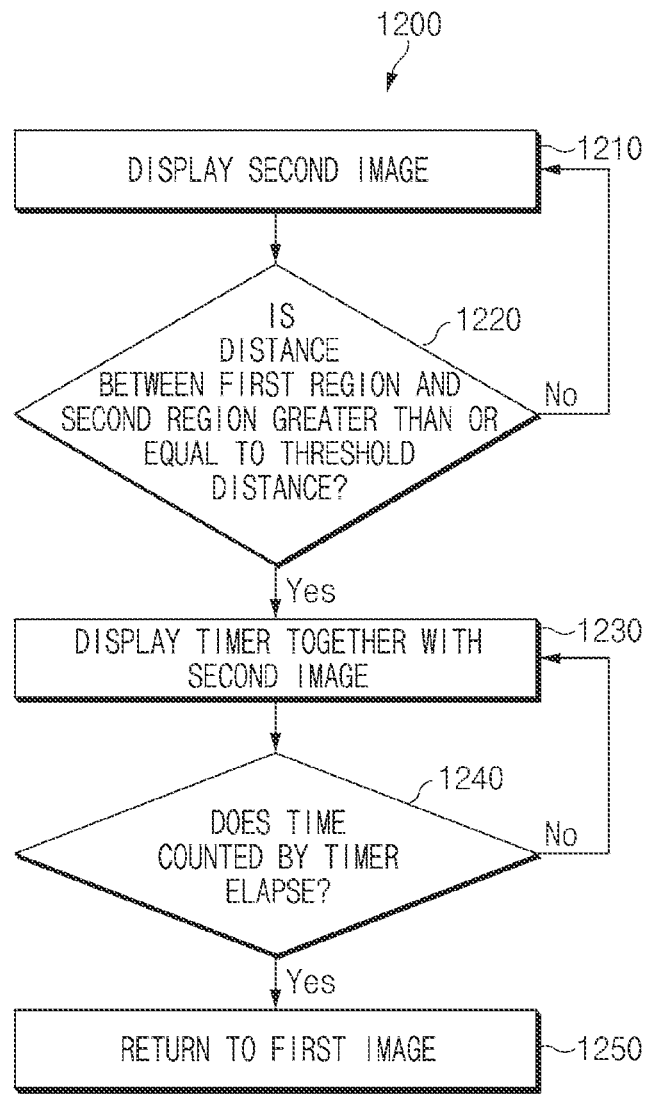
FIG. 12 is a flowchart illustrating a method for displaying an image in an electronic device according to an embodiment of the disclosure.

FIG. 12 is a drawing illustrating a method for displaying an image in an electronic device (e.g., an electronic device 101 of FIG. 3A) according to an embodiment.

Referring to FIG. 12, in a method 1200, in operation 1210, a processor (e.g., a processor 120 of FIG. 3A) of the electronic device 101 according to an embodiment may display a second image. When a distance between a first region (e.g., a first region 710 of FIG. 7) and a second region (e.g., a second region 720 of FIG. 7), which are adjacent to each other, among a plurality of sub-regions (e.g., the sub-regions 710 and 720 of FIG. 7) is greater than or equal to a specified threshold distance, the processor 120 may display the second image generated based on the first region 710 and the second region 720.

In operation 1220, the processor 120 of the electronic device 101 according to an embodiment may identify whether the distance between the first region 710 and the second region 720 while displaying the second image is less than the threshold distance. A subject (e.g., a first subject 410 and a second subject 420 of FIG. 7) included in the first region 710 and a subject (e.g., a third subject 430 of FIG. 7) included in the second region 720 may move away from each other over the threshold distance and may then move close to each other below the threshold distance. The processor 120 may detect a situation where the distance between the first region 710 and the second region 720 is greater than or equal to the threshold distance to display the second image and then where the distance between the first region 710 and the second region 720 is less than the threshold distance. When the distance between the first region 710 and the second region 720 is greater than or equal to the threshold distance while the second image is displayed (No in operation 1220), the processor 120 may return to operation 1210 to continue displaying the second image. When the distance between the first region 710 and the second region 720 is less than the threshold distance while the second image is displayed (Yes in operation 1220), the processor 120 may proceed to operation 1230.

In operation 1230, the processor 120 of the electronic device 101 according to an embodiment may display a timer counting a specified waiting time together with the second image. The waiting time may be a time waiting while the second image is maintained before the second image returns to the first image. For example, the waiting time may be set to a time of greater than or equal to about 2 seconds and less than or equal to about 10 seconds.

In an embodiment, the subjects 410 and 420 included in the first region 710 and the subject 430 included in the second region 720 may continue moving. The subjects 410 and 420 included in the first area 710 and the subject 430 included in the second region 720 may be temporarily close to each other below the threshold distance and may be close to below the threshold distance such that a specified time elapses. Although the subjects 410 and 420 included in the first area 710 and the subject 430 included in the second region 720 are temporarily close to each other, when the second image returns to the first image whenever a distance between the subjects 410 and 420 and the subject 430 is less than the threshold distance, power consumption may be wasted because a screen change and rearrangement is performed more than is necessary and it may be interrupted for a user to view an image by many screen changes. The processor 120 may maintain the second image before a waiting time elapses after displaying the second image, thus reducing power consumption and improving visibility of the image.

In an embodiment, the processor 120 may display a timer counting a waiting time together while displaying the second image. The timer may count down the waiting time from a time when the subjects 410 and 420 included in the first region 710 and the subject 430 included in the second region 720 are close to each other.

In operation 1240, the processor 120 of the electronic device 101 according to an embodiment may identify whether the waiting time counted by the timer elapses. The timer may count down the waiting time from a time when the subjects 410 and 420 included in the first region 710 and the subject 430 included in the second region 720 are close to each other. The timer may reach "0" when the waiting time elapses. When the timer reaches "0", the processor 120 may determine that the waiting time counted by the timer elapses. When the waiting time counted by the timer does not elapse (No in operation 1240), the processor 120 may maintain operation 1230 to display the timer counting the waiting time together while displaying the second image. When the subjects 410 and 420 included in the first region 710 and the subject 430 included in the second region 720 move away from each other over the threshold distance before the timer 1310 reaches "0", the processor 120 may be configured to initialize the waiting time. When the waiting time counted by the timer elapses (Yes in operation 1240), the processor 120 may proceed to operation 1250.

In operation 1250, the processor 120 of the electronic device 101 according to an embodiment may return to the first image. The processor 120 may detect that the timer displays "0" and the waiting time elapses. When the subjects 410 and 420 included in the first region 710 and the subject 430 included in the second region 720 are kept less than the threshold distance although a specified time elapses, the processor 120 may display the original first image.

Figure 13:
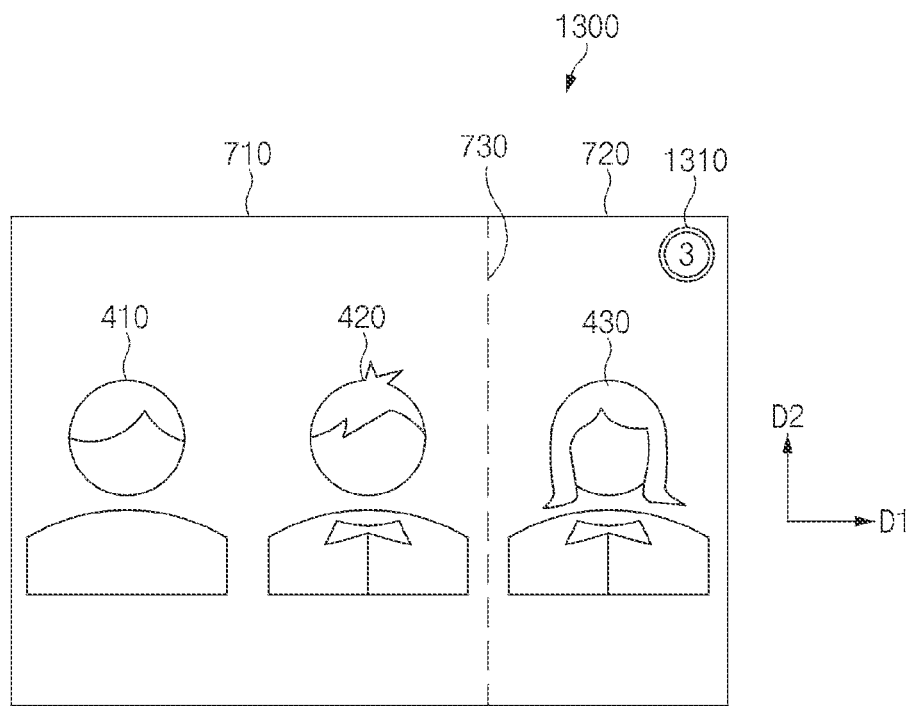
FIG. 13 is a drawing illustrating a second image and a timer according to an embodiment.

FIG. 13 is a drawing illustrating a second image and a timer according to an embodiment of the disclosure.

Referring to FIG. 13, in an embodiment, the second image may highlight a first region 710 and a second region 720 in image data 1300. When a distance between subjects 410 and 420 included in a first region 710 and a subject 430 included in a second region 720 is less than a threshold distance while a second image is displayed, a timer 1310 may be displayed at one side of the second image. When a timer 1310 is displayed, an initial time may be a waiting time. For example, the initial time may be 3 seconds. When the distance between the subjects 410 and 420 included in the first region 710 and the subject 430 included in the second region 720 is less than the threshold distance while the second image is displayed, the timer 1310 may count down time. When the timer 1310 reaches "0", a processor (e.g., a processor 120 of FIG. 3A) may determine that the waiting time elapses and may return the second image to a first image. When the subjects 410 and 420 included in the first region 710 and the subject 430 included in the second region 720 move away from each other over the threshold distance before the timer 1310 reaches "0", the processor 120 may be configured to stop the countdown of the timer 1310. When the subjects 410 and 420 included in the first region 710 and the subject 430 included in the second region 720 move away from each other over the threshold distance before the timer 1310 reaches "0", the processor 120 may be configured to initialize the timer 1310 to the waiting time and display the second image.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the disclosure, when an interval between the plurality of subjects is greater than or equal to a specified distance, the electronic device may remove a space between the plurality of subjects, may zoom in on each of the subjects at a higher magnification, and may display the zoomed-in subjects on the screen.

Furthermore, according to embodiments disclosed in the disclosure, when the interval between the plurality of subjects is greater than or equal to the specified distance, the electronic device may set a plurality of sub-regions to respectively include the plurality of subjects and may rearrange the plurality of sub-regions to more freely arrange each of the subjects on the screen.

In addition, various effects ascertained directly or indirectly through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for displaying a live video image in an electronic device, the method comprising:

obtaining a first live video image comprising a plurality of subjects;

setting a plurality of sub-regions, in the first live video image, corresponding to the plurality of subjects, respectively, each of the plurality of sub-regions including at least one of the plurality of subjects;

causing a second live video image to be displayed by changing a size of each of the plurality of sub-regions and arranging the plurality of sub-regions based on a number of the plurality of sub-regions; and maintaining the changed size and arrangement of the plurality of sub-regions in the second live video image for a predetermined waiting time period after one of the plurality of subjects changes from being present in a corresponding one of the plurality of sub-regions to being absent from the corresponding one of the plurality of sub-regions during displaying of the plurality of sub-regions of the second live video image.

2. The method of claim 1,
wherein the plurality of sub-regions are set at different locations in the first live video image,
wherein each of the plurality of sub-regions is set as a boundary box of each of the plurality of subjects, respectively, and
wherein each sub-region includes an entire area inside a border of the boundary box of a corresponding at least one subject.

3. The method of claim 1, wherein the arranging of each of the plurality of sub-regions comprises:
arranging the plurality of sub-regions to display each of the plurality of sub-regions as being adjacent to each other in a first direction while displaying a division line between the plurality of sub-regions.

4. The method of claim 1, wherein the arranging of each of the plurality of sub-regions comprises:
arranging the plurality of sub-regions to display the plurality of sub-regions as separate windows, respectively, while overlapping at least some of edges or regions forming the separate windows.

5. The method of claim 1, wherein the first live video image comprises at least one of a screen, a video, or a preview screen captured by one camera.

6. The method of claim 1, wherein each subject of the plurality of subjects comprises a person.

7. The method of claim 1, wherein the plurality of sub-regions are set to not overlap each other.

8. The method of claim 1, further comprising:
in response to a change of the number of the plurality of sub-regions, rearranging each of the plurality of sub-regions in the second live video image after the predetermined waiting time period elapses.

9. An electronic device, comprising:
a camera circuitry including an image sensor, the camera circuitry being configured to capture image data corresponding to an external environment;
a processor operatively connected to the camera circuitry; and
a memory operatively connected to the processor,
wherein the memory stores instructions which, when executed, cause the processor to:
obtain a first live video image comprising a plurality of subjects,
set a plurality of sub-regions, in the first live video image, corresponding to the plurality of subjects, respectively, each of the plurality of sub-regions including at least one of the plurality of subjects, cause a second live video image to be displayed by changing a size of each of the plurality of sub-regions and arranging the plurality of sub-regions based on a number of the plurality of sub-regions, and maintain the changed size and arrangement of the plurality of sub-regions in the second live video image for a predetermined waiting time period after one of the plurality of subjects changes from being present in a corresponding one of the plurality of sub-regions to being absent from the corresponding one of the plurality of sub-regions during displaying of the plurality of sub-regions of the second live video image.

10. The electronic device of claim 9,
wherein the plurality of sub-regions are set at different locations in the first live video image,
wherein each of the plurality of sub-regions is set as a boundary box of each of the plurality of subjects, respectively, and
wherein each sub-region includes an entire area inside a border of the boundary box of a corresponding at least one subject.

11. The electronic device of claim 9, wherein the arranging of each of the plurality of sub-regions comprises:
arranging the plurality of sub-regions to display each of the plurality of sub-regions as being adjacent to each other in a first direction while displaying a division line between the plurality of sub-regions.

12. The electronic device of claim 9, wherein the arranging of each of the plurality of sub-regions comprises:
arranging the plurality of sub-regions to display the plurality of sub-regions as separate windows, respectively, while overlapping at least some of edges or regions forming the separate windows.

13. The electronic device of claim 9, wherein the first live video image comprises at least one of a screen, a video, or a preview screen captured by one camera.

14. The electronic device of claim 9, wherein each subject of the plurality of subjects comprises a person.

15. The electronic device of claim 9, wherein the plurality of sub-regions are set to not overlap each other.

16. A non-transitory computer-readable storage medium storing one or more computer programs including instructions which, when executed by at least one processor, cause the at least one processor to control for:
obtaining a first live video image comprising a plurality of subjects;
displaying a plurality of sub-regions, in the first live video image, corresponding to the plurality of subjects, respectively, each of the plurality of sub-regions including at least one of the plurality of subjects;
causing a second live video image to be displayed by changing a size of each of the plurality of sub-regions and arranging the plurality of sub-regions based on a number of the plurality of sub-regions; and
maintaining the changed size and arrangement of the plurality of sub-regions in the second live video image for a predetermined waiting time period after one of the plurality of subjects changes from being present in a corresponding one of the plurality of sub-regions to being absent from the corresponding one of the plurality of sub-regions during displaying of the plurality of sub-regions of the second live video image.

17. The non-transitory computer-readable storage medium of claim 16, wherein the plurality of sub-regions are set at different locations in the first live video image, wherein each of the plurality of sub-regions is set as a boundary box of each of the plurality of subjects, respectively, and wherein each sub-region includes an entire area inside a border of the boundary box of a corresponding at least one subject.

18. The non-transitory computer-readable storage medium of claim 16, wherein the instructions, when executed by the at least one processor, further cause the at least one processor to control for:

arranging the plurality of sub-regions to display each of the plurality of sub-regions as being adjacent to each other in a first direction while displaying a division line between the plurality of sub-regions.

19. The non-transitory computer-readable storage medium of claim 16, wherein the instructions, when executed by the at least one processor, further cause the at least one processor to control for:

arranging the plurality of sub-regions to display the plurality of sub-regions as separate windows, respectively, while overlapping at least some of edges or regions forming the separate windows.

20. The non-transitory computer-readable storage medium of claim 16, wherein the first live video image comprises at least one of a screen, a video, or a preview screen captured by one camera.

21. The non-transitory computer-readable storage medium of claim 16, wherein each subject of the plurality of subjects comprises a person.

22. The non-transitory computer-readable storage medium of claim 16, wherein the plurality of sub-regions are set to not overlap each other.

23. The non-transitory computer-readable storage medium of claim 16, wherein the instructions, when executed by the at least one processor, further cause the at least one processor to control for:

in response to a change of the number of the plurality of sub-regions, rearranging each of the plurality of sub-regions in the second live video image after the predetermined waiting time period elapses.

\* \* \* \* \*